United States Patent
Yang

(10) Patent No.: US 9,227,551 B2
(45) Date of Patent: Jan. 5, 2016

(54) RATCHET BUCKLE

(71) Applicant: Fang-Lin Yang, Taichung (TW)

(72) Inventor: Fang-Lin Yang, Taichung (TW)

( * ) Notice: Subject to any disclaimer, the term of this patent is extended or adjusted under 35 U.S.C. 154(b) by 122 days.

(21) Appl. No.: 14/066,056

(22) Filed: Oct. 29, 2013

(65) Prior Publication Data

US 2015/0113775 A1   Apr. 30, 2015

(51) Int. Cl.
*B66F 3/00* (2006.01)
*B21F 9/00* (2006.01)
*B60P 7/08* (2006.01)

(52) U.S. Cl.
CPC .............. *B60P 7/083* (2013.01); *Y10T 24/2175* (2015.01)

(58) Field of Classification Search
CPC ......... B66D 3/02; B60P 7/083; B60P 7/0838; B60P 7/0846; Y10T 24/2113; Y10T 24/2117; Y10T 24/2121; Y10T 24/2147; Y10T 24/2157
See application file for complete search history.

(56) References Cited

U.S. PATENT DOCUMENTS

| | | | | | |
|---|---|---|---|---|---|
| 4,227,286 | A | * | 10/1980 | Holmberg | 24/68 CD |
| 5,426,826 | A | * | 6/1995 | Takimoto | 24/68 CD |
| 6,102,371 | A | * | 8/2000 | Wyers | 254/218 |
| 7,444,718 | B1 | * | 11/2008 | Chang | 24/68 CD |
| 8,209,821 | B1 | * | 7/2012 | Chen | 24/68 CD |
| 2001/0045548 | A1 | * | 11/2001 | Landy | 254/217 |
| 2003/0084550 | A1 | * | 5/2003 | Fang | 24/68 CD |
| 2006/0197072 | A1 | * | 9/2006 | Huang | 254/217 |
| 2007/0122247 | A1 | * | 5/2007 | Madachy et al. | 410/100 |
| 2009/0119892 | A1 | * | 5/2009 | Breeden et al. | 24/68 CD |
| 2010/0205790 | A1 | * | 8/2010 | Chen | 24/68 CD |
| 2012/0073097 | A1 | * | 3/2012 | Chang | 24/68 CD |
| 2012/0205601 | A1 | * | 8/2012 | Joubert et al. | 254/217 |
| 2012/0233824 | A1 | * | 9/2012 | Breeden et al. | 24/68 CD |

* cited by examiner

*Primary Examiner* — Emmanuel M Marcelo
(74) *Attorney, Agent, or Firm* — Rosenberg, Klein & Lee

(57) ABSTRACT

A ratchet buckle, which is configured to connect a first strap and a second strap, includes a controlling device, an operating device connected to the first strap, a reel passing through the controlling device and the operating device along an axial line, the second strap wound around the reel, at least one ratchet set mounted on the reel, the reel being not rotated relative to the ratchet set, and a pawl device. When the user wants to unwind the second strap from the reel, the user moves and rotates the controlling device smoothly with only one hand thereof; therefore, it's very convenient for the user to operate.

10 Claims, 17 Drawing Sheets

RATCHET BUCKLE

BACKGROUND OF THE INVENTION

1. Field of the Invention

The present invention relates to a buckle, and more particularly to a ratchet buckle.

2. Description of the Prior Art

Referring to FIG. 17, when a truck carries an article, a user usually uses a conventional ratchet buckle 1 to bind the article, so as to prevent the article from unexpectedly dropping down from the truck. The conventional ratchet buckle 1 comprises a first strap 11, a second strap 12, a controlling device 13, an operating device 14, a reel 15 and two ratchet wheels 16. The operating device 14 is connected to the first strap 11. The reel 15 passes through the controlling device 13 and the operating device 14 along an axial direction. The two ratchet wheels 16 are respectively mounted around two ends of the reel 15. The reel 15 is not rotated relative to the two ratchet wheels 16. The controlling device 113 has a plate unit 131. The plate unit 131 is engaged with the ratchet wheels 16 or disengaged from the ratchet wheels 16. The operating device 14 has a pawl member 141. The pawl member 141 allows the ratchet wheels 16 to be only clockwise rotated.

When a user operates the conventional ratchet buckle 1, an article is bound with the first strap 11 and the second strap 12; the user rotates the controlling device 13 clockwise, the ratchet wheels 16 are rotated clockwise by said rotation and the reel 15 is rotated clockwise by the rotation of the ratchet wheels 16; wherein, the pawl member 141 is disengaged form the ratchet wheels 16 step by step and the plate unit 131 is engaged with the ratchet wheels 16. As a result, a certain length of the second strap 12 is wound around the reel 15 via the rotation of the reel 15.

Thereafter, the user the user rotates the controlling device 13 counterclockwise, the ratchet wheels 16 are not rotated counterclockwise by said rotation; wherein, the pawl member 141 is engaged with the ratchet wheels 16 and the plate unit 131 is disengaged from the ratchet wheels 16 step by step. Therefore, the user continues rotating the controlling device 13 clockwise, so as to continue winding the certain length of the second strap 12 around the reel 15, so that the article is tightly bound.

When the user wants to unwind the second strap 12 from the reel 15, the user stirs the plate unit 131 away from the ratchet wheels 16, and rotates the controlling device 13 clockwise until the controlling device 13 and the operating device 14 are almost parallel with each other; as a result, an extending portion (not shown) of the controlling device 13 pushes the pawl member 141 away from the ratchet wheels 16. Therefore, the reel 15 is freely rotatable, because the ratchet wheels 16 is disengaged from the plate unit 131 and the pawl member 141.

However, there are some disadvantages of the conventional ratchet buckle 1 as following:

First, a structure of the conventional ratchet buckle 1 is too complicated to lose weight thereof, because of an arrangement of the plate unit 131 and the pawl member 141.

Second, an unexpected disengagement between the pawl member 141 and the ratchet wheels 16 might often happen, because a strain of the second strap 12 always pulls the ratchet wheels 16 away from the pawl member 141.

The present invention is, therefore, arisen to obviate or at least mitigate the above mentioned disadvantages.

SUMMARY OF THE INVENTION

An object of the present invention is to provide an improved buckle.

To achieve the above and other objects, a ratchet buckle, which is configured to connect a first strap and a second strap, comprises a controlling device, an operating device connected to the first strap, a reel passing through the controlling device and the operating device along an axial line, the second strap wound around the reel, at least one ratchet set mounted on the reel, the reel being not rotated relative to the ratchet set, a pawl device having a first through hole, a first pawl member, a second through holes and a second pawl members, the first through hole formed on the controlling device therethrough, along the axial line, the reel passing through the through holes, the first pawl member defined on the controlling device, the first pawl member being close to the first through hole, the first through hole being movable relative to the reel so that the controlling device and the first pawl member are movable between a lock position under which the first pawl member is engaged with the ratchet set, and an unlock position under which the first pawl member is disengaged from the ratchet set, the second through hole formed on the operating device therethrough, along the axial line, the reel passing through the second through hole, the second pawl member defined on the operating device, the second pawl member being close to the second through hole, the reel being movable relative to the second through hole so that the reel is movable between a first position under which the second pawl member is engaged with the ratchet set, and a second position under which the second pawl member is disengaged from the ratchet set. Wherein, a strain of the second strap pulls the reel toward the first position; the controlling device has two connectors, a handle and two extending portions; the handle is connected between the two connectors; there are two ratchet sets; there are two first through holes and two first pawl members; each first pawl member is defined on each corresponding connector; each first pawl member has a first engaging portion for preventing the ratchet set from being rotate; each extending portion is defined at one end of each corresponding connector; each extending portion presses each first pawl member and moves the reel relative to the first through hole; as a result, the first pawl member is prevented from being engaged with the ratchet set; the operating device has two wall members, a rod member, two first notches; the two wall members are spaced from each other; the rod member is connected between two ends of the two wall members; the rod member is connected to the first strap; each first notch is formed at a top periphery of each corresponding wall member; when the first pawl member is engaged with each corresponding first notch, the second pawl member is disengaged form the ratchet set.

A ratchet buckle, which is configured to connect a first strap and a second strap, comprises a controlling device, an operating device connected to the first strap, a reel passing through the controlling device and the operating device along an axial line, the second strap wound around the reel, at least one ratchet set mounted on the reel, the reel being not rotated relative to the ratchet set, a pawl device having a first through hole, a first pawl member, the first through hole is formed on the controlling device therethrough, along the axial line, the reel passing through the first through hole, the first pawl member defined on the controlling device, the first pawl member being close to the first through hole, the first through hole being movable relative to the reel so that the controlling device and the first pawl member being movable between a lock position under which the first pawl member is engaged with the ratchet set, and an unlock position under which each first pawl member is disengaged from the ratchet set. Wherein, the operating device has two wall members and a rod member; the two wall members are spaced from each other; the rod member is connected between two ends of the two wall members; the rod member is connected to the first strap; the operating device has a pawl plate and an elastic member; the pawl plate is movably assembled between the two wall members; the elastic member is assembled on the pawl plate and the wall members; a recovery force of the elastic member has the pawl plate engage with the ratchet set; the controlling device has two connectors, a handle and two extending portions; the handle is connected between the two connectors; there are two ratchet sets; there are two first through holes and two first pawl members; each first pawl member is defined on each corresponding connector; each first pawl member has a first engaging portion for prevent the ratchet set from being rotate; each extending portion is defined at one end of each corresponding connector; each extending portion presses pawl plate and disengages pawl plate from the ratchet set; the operating device has two first notches; each first notch is formed at a top periphery of each corresponding wall member; when the first pawl member is engaged with each corresponding first notch, the first pawl member is disengaged form the ratchet set.

A ratchet buckle, which is configured to connect a first strap and a second strap, comprises a controlling device, an operating device connected to the first strap, a reel passing through the controlling device and the operating device along an axial line, the second strap wound around the reel, a pawl device having a second through holes and a second pawl members, the second through hole formed on the operating device therethrough, along the axial line, the reel passing through the second through hole, the second pawl member defined on the operating device; the second pawl member being close to the second through hole, at least one ratchet set mounted on the reel, the reel being not rotated relative to the ratchet set, the reel being movable relative the second through hole so that the reel is movable between a first position under which the second pawl member is engaged with the ratchet set, and a second position under which the second pawl member is disengaged from the ratchet set. Wherein, a strain of the second strap pulls the reel toward the first position; the operating device has two wall members and a rod member; the two wall members are spaced from each other; the rod member is connected between two ends of the two wall members; the rod member is connected to the first strap; there are two ratchet sets; there are two second through holes and two second pawl members; each second pawl member is defined on each corresponding wall member; each second pawl member has a second engaging portion for prevent the ratchet set from being rotate; the controlling device has two connectors and a handle; the two connectors are connected to the reel; the handle is connected between the two connectors; the controlling device has a plate unit and an elastic unit; the plate unit is movably assembled between the two connectors; the elastic unit is assembled between the plate unit and the connectors; a recovery force of the elastic unit has the plate unit engage with the ratchet set; the controlling device has two extending portions; each extending portion is defined at one end of each corresponding connector; each extending portion presses each second pawl member and moves the reel relative to the second through hole; as a result, the second pawl member is prevented from being engaged with the ratchet set.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
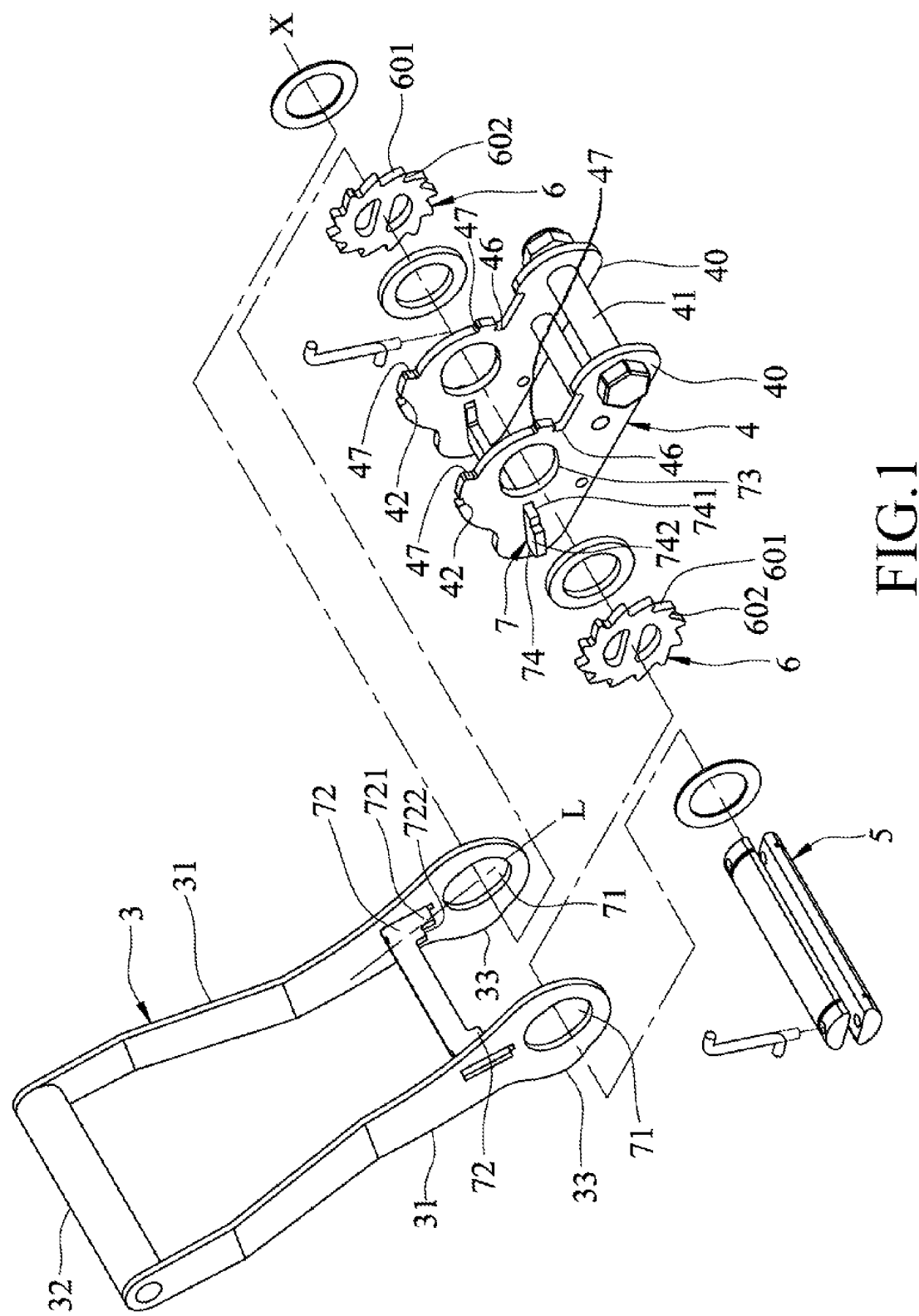
FIG. 1 is an exploded view of a first embodiment of the present invention.

Referring to FIGS. 2-5, a first embodiment of the present invention is described as following. A ratchet buckle in accordance with the present invention is configured to connect a first strap 21 and a second strap 22. The ratchet buckle comprises a controlling device 3, an operating device 4, a reel 5, a ratchet set 6 and a pawl device 7. The controlling device 3 has two connectors 31, a handle 32 and two extending portions 33. The handle 32 is connected between the two connectors 31. Each extending portion 33 is defined at one end of each corresponding connector 31. The operating device 4 has two wall members 40, a rod member 41, two first notches 42, two second notches 46 and two pair of abutting portions 47. The two wall members 40 are spaced from each other. The rod member 41 is connected between two ends of the two wall members 40. The rod member 41 is connected to the first strap 21. Each first notch 42 is formed at a top periphery of each corresponding wall member 40. Each second notch 46 is formed at a corner of the top periphery of each corresponding wall member 40. Each pair of the abutting portions 47 is defined between each corresponding second notch 46 and each corresponding first notch 42 at the top periphery of each corresponding wall member 40. Two abutting portions 47 of each pair of the abutting portions 47 are spaced from each other.

The reel 5 passes through the two connectors 31 of the controlling device 3 and the two wall members 40 of the operating device 4, along an axial line X. The second strap 22 is wound around the reel 5. The ratchet set 6 is mounted around two ends of the reel 5. The reel 5 is not rotated relative to the ratchet set 6. The ratchet set 6 has a plurality of disengaging faces 601 and a plurality of engaging faces 602. The disengaging faces 601 are extended from a periphery of the ratchet set 6. Each engaging face 602 is adjacent to each corresponding disengaging face 601.

The pawl device 7 has two first through holes 71, two first pawl members 72, two second through holes 73 and two second pawl members 74. Each first through hole 71 is formed on each corresponding connector 31 therethrough, along the axial line X. The reel 5 passes through the two first through holes 71 on the two connectors 31. Each first pawl member 72 is defined on each corresponding connector 31. Each first pawl member 72 is close to each corresponding first through hole 71. Each second through hole 73 is formed on each corresponding wall member 40 therethrough, along the axial line X. The reel 5 passes through the two second through holes 73 on the two wall members 40. Each second pawl member 74 is defined on each corresponding wall member 40. Each second pawl member 74 is close to each corresponding second through hole 73. Each first through hole 71 and each second through hole 73 are slot-shaped. A central line L is defined by two end points of each first through hole 71 which is slot-shaped (as shown in FIG. 1). An angle is defined by the axial line X and the central line L. The two first pawl members 72 are defined as two ends of one plate object. The two second pawl members 74 are defined as two ends of another plate object. The two plate objects are respectively extended across the two connectors 31 and the two wall members 40. Each first pawl member 72 has a first engaging portion 721 and a first extruded portion 722. Each second pawl member 74 has a second engaging portion 741 and a second extruded portion 742. The first engaging portion 721 and the second engaging portion 741 respectively correspond to the engaging faces 602. The first extruded portion 722 and the second extruded portion 742 are respectively adjacent to the first engaging portion 7211 and the second engaging portion 741. The first extruded portion 722 and the second extruded portion 742 are respectively located behind the first engaging portion 721 and the second engaging portion 741. The second engaging portion 741 and the second extruded portion 742 are mounted at an outer side of each corresponding wall member 40. The first engaging portion 721 and the first extruded portion 722 are mounted at an inner side of each corresponding connector 31.

Figure 2:
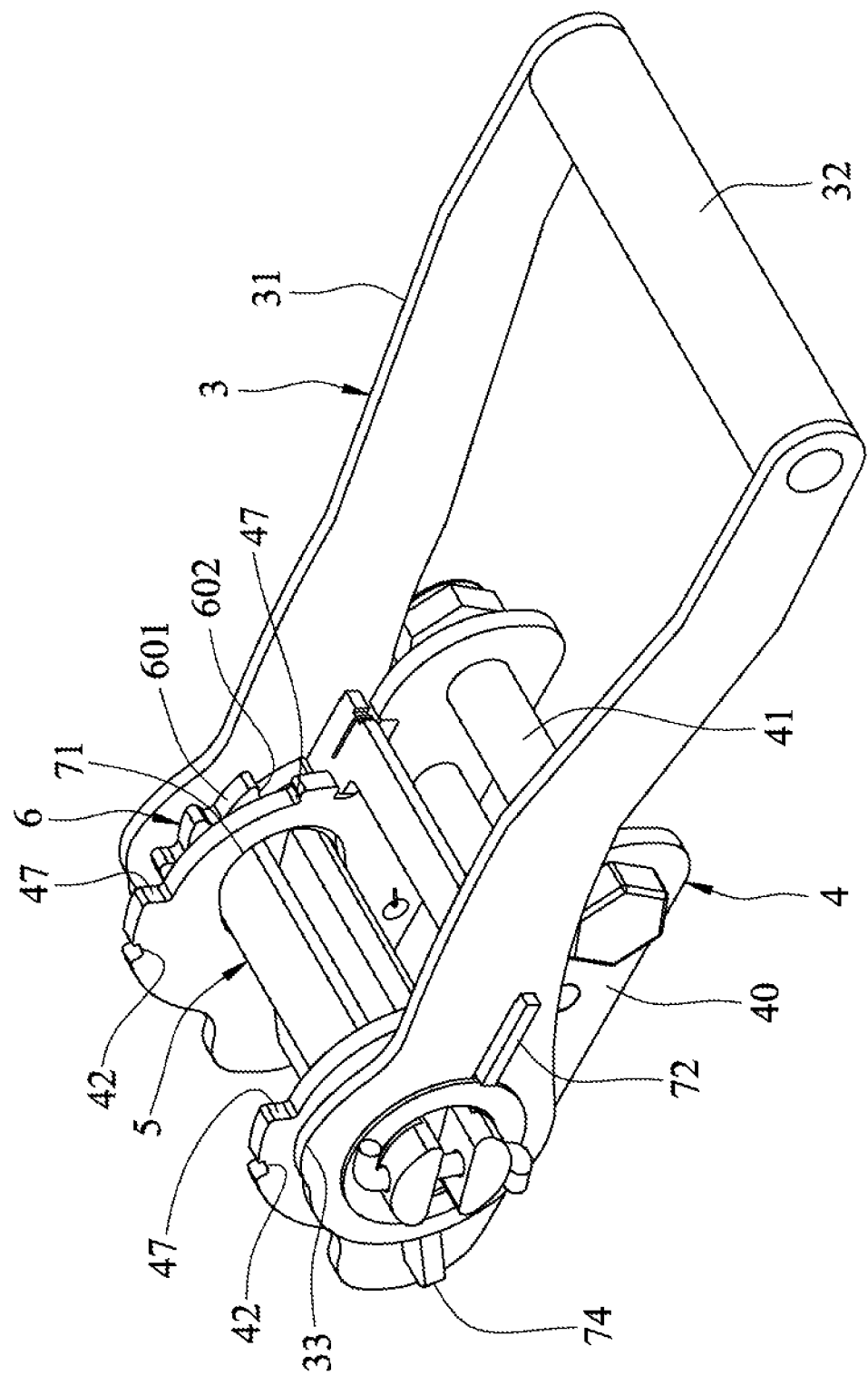
FIG. 2 is a perspective view of the first embodiment of the present invention.
Figure 3:
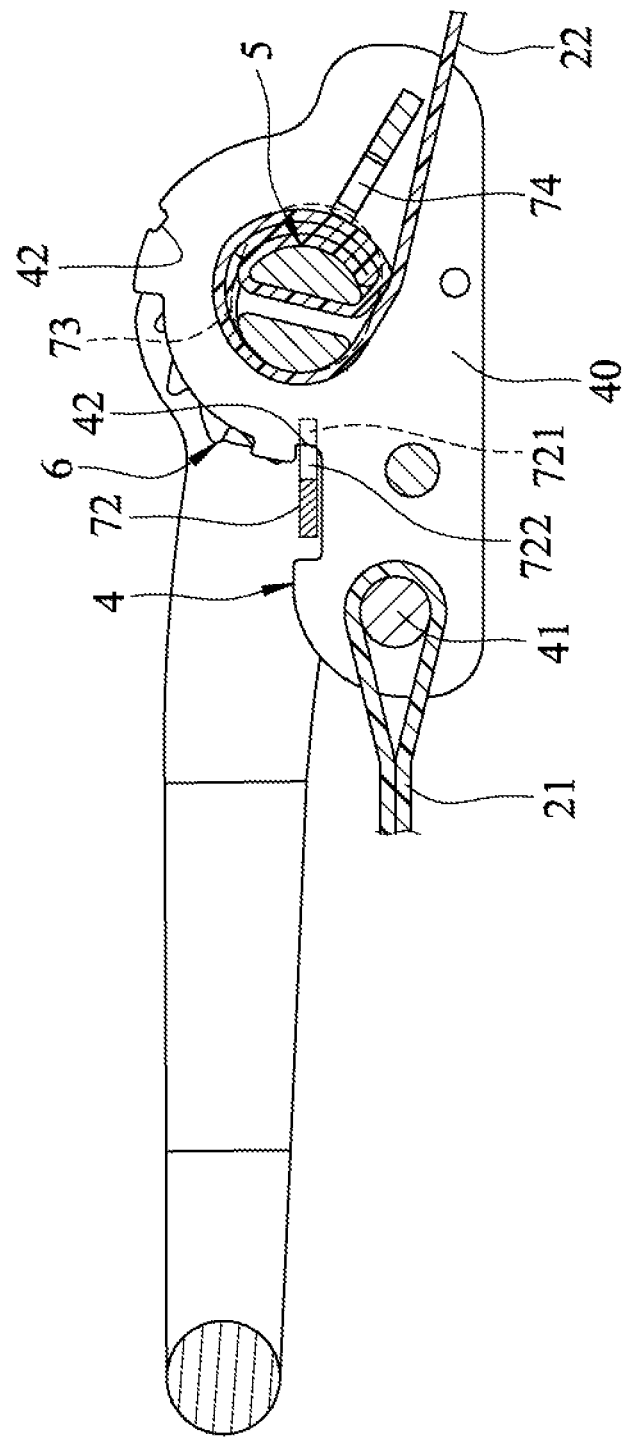
FIG. 3 is a cross-sectional view of the first embodiment of the present invention.
Figure 5:
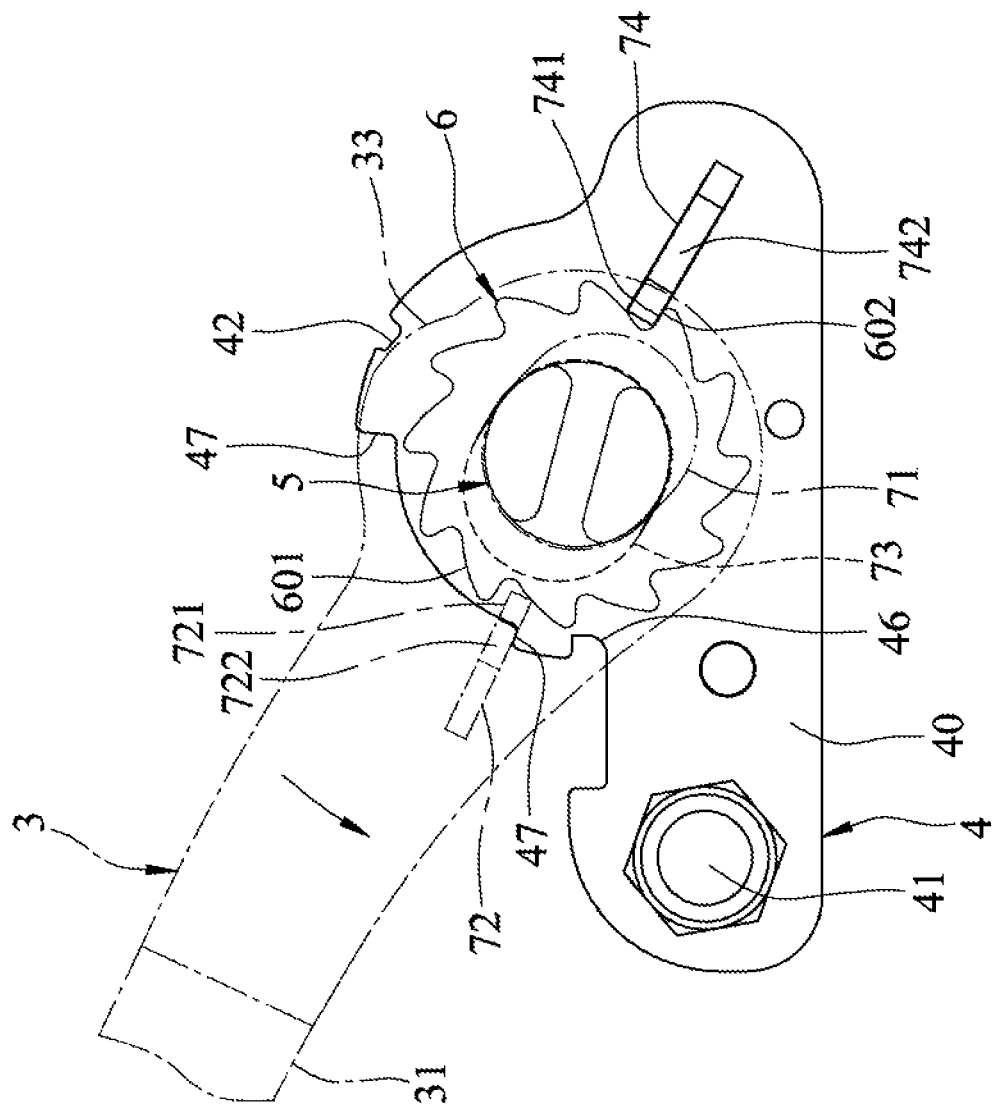
FIG. 5 is a side view of the first embodiment for showing a controlling device being counterclockwise rotated.

Referring to FIGS. 2-3 and 5, when a user operates the present invention, an article is bound with the first strap 21 and the second strap 22; a strain of the second strap 22 pulls the reel 5 toward an inner wall of each second through hole 73 until the reel 5 abuts against the inner wall of each second through hole 73; as a result, the ratchet set 6 at the reel 5 is further engaged with the two second pawl members 74, wherein the second engaging portion 741 of each second pawl member 74 abuts against one engaging faces 602 of the ratchet set 6. Therefore, the ratchet set 6 cannot be rotated counterclockwise, but can be rotated clockwise.

Figure 4:
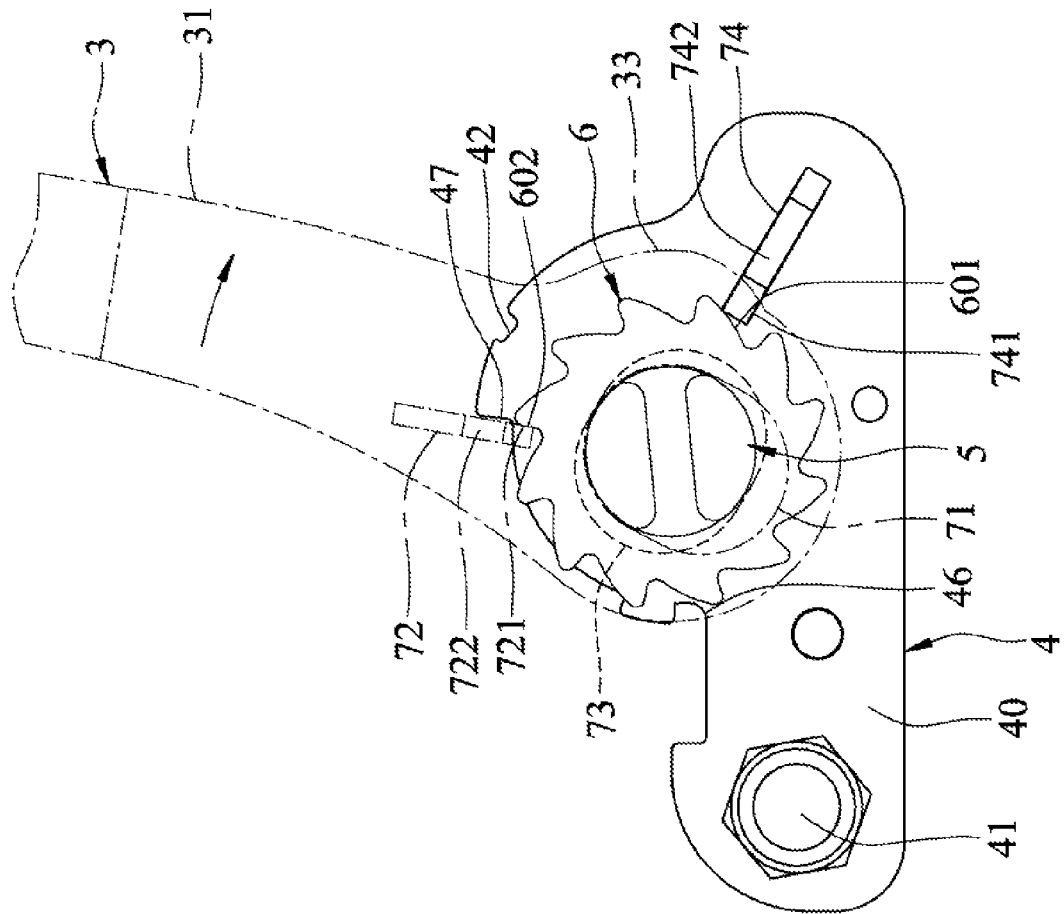
FIG. 4 is a, side view of the first embodiment for showing a controlling device being clockwise rotated.

Referring to FIGS. 3-4, when the user pushes the controlling device 3 toward the reel 5 to a lock position and rotates the controlling device 3 clockwise, the ratchet set 6 is rotated clockwise by said rotation, until the first extruded portion 722 abuts against one abutting portion 47 of each corresponding pair of the abutting portions 47; wherein, the first engaging portion 721 is engaged with one engaging face 602; simultaneously the second engaging portion 741 is disengaged from the disengaging faces 601 step by step, until the first extruded portion 722 abuts against one abutting portion 47 of each corresponding pair of the abutting portions 47. As a result, the reel 5 is rotated clockwise by the rotation of the ratchet set 6 until the first extruded portion 722 abuts against one abutting portion 47 of each corresponding pair of the abutting portions 47, so that a certain length of the second strap 22 is wound around the reel 5 via the rotation of the reel 5.

Referring to FIGS. 4-5, thereafter, when the user rotates the controlling device 3 counterclockwise, the ratchet set 6 is not rotated counterclockwise by said rotation, even the first extruded portion 722 abuts against another abutting portion 47 of each corresponding pair of the abutting portions 47; wherein, the first engaging portion 721 is disengaged from the disengaging faces 601 step by step; simultaneously, the second engaging portion 741 is engaged with one engaging face 602, even the first extruded portion 722 abuts against another abutting portion 47 of each corresponding pair of the abutting portions 47. As a result, the reel 5 and the ratchet set 6 are not rotated counterclockwise even the first extruded portion 722 abuts against another abutting portion 47 of each corresponding pair of the abutting portions 47, so that the second strap 22 would not be unwound from the reel 5 because the reel 5 is not rotated counterclockwise. Thereafter, the user continues rotating the controlling device 3 clockwise, so as to further wind the certain length of the second strap 22 around the reel 5.

Figure 6:
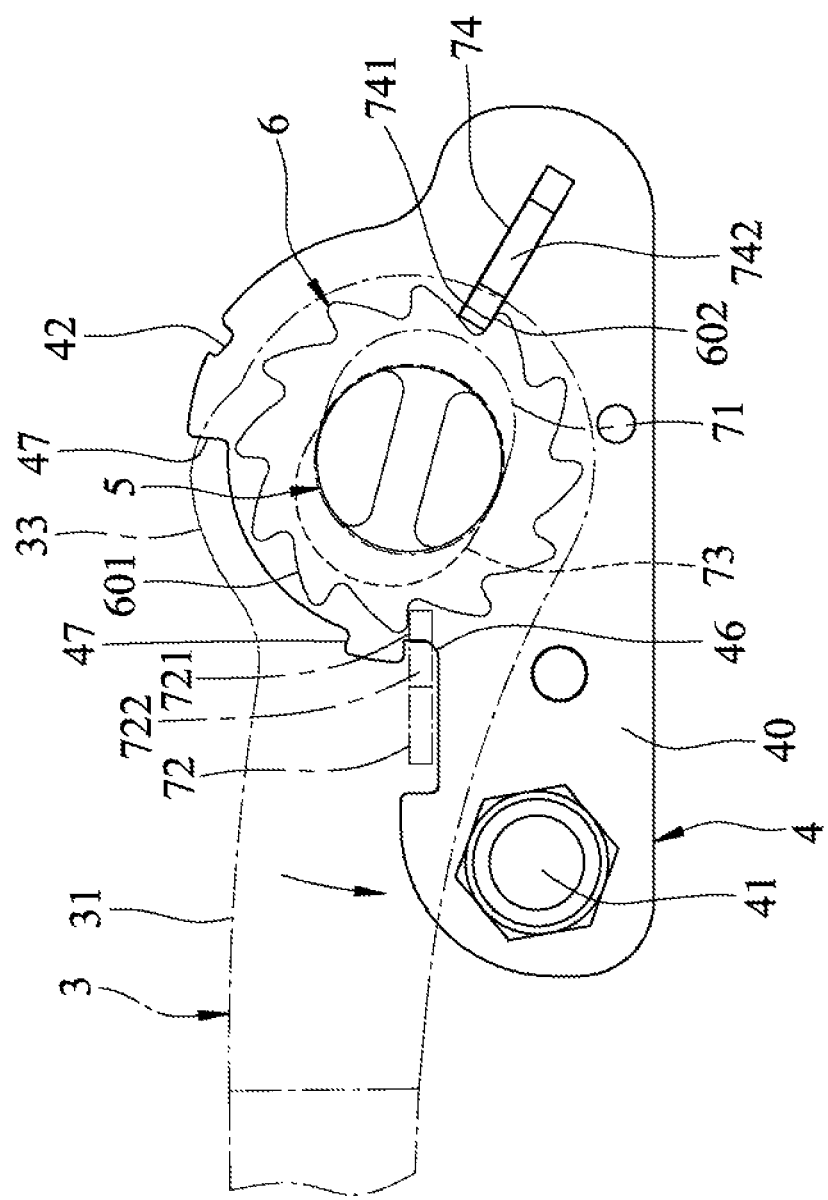
FIG. 6 is a side view of the first embodiment for showing a first extruded portion being engaged with a second notch.

Referring to FIG. 6, when the user does not want to wind the second strap 22 around the reel 5 any more, the user rotates the controlling device counterclockwise until the first extruded portion 722 abuts against another abutting portion 47 of each corresponding pair of the abutting portions 47; then, the user pulls the controlling device 3 away from the reel 5 to a unlock position and continues rotating the controlling device 3 counterclockwise until the first extruded portion 722 is engaged with each corresponding second notch 46; as a result, the controlling device 3 is locked so as to prevent the ratchet set 6 from unexpectedly rotating.

Figure 7:
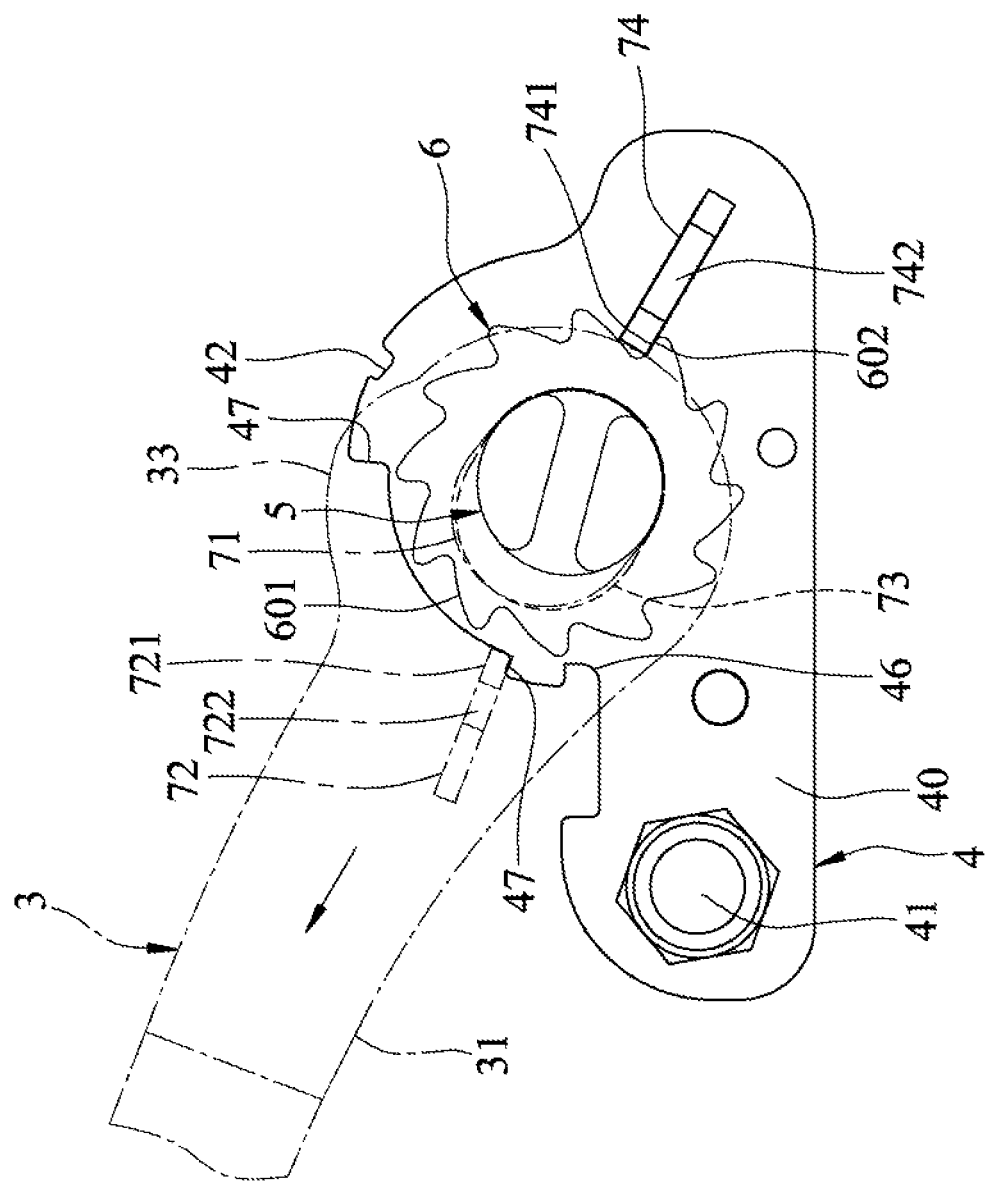
FIG. 7 is a side view of the first embodiment for showing the controlling device being located at an unlocked position.
Figure 8:
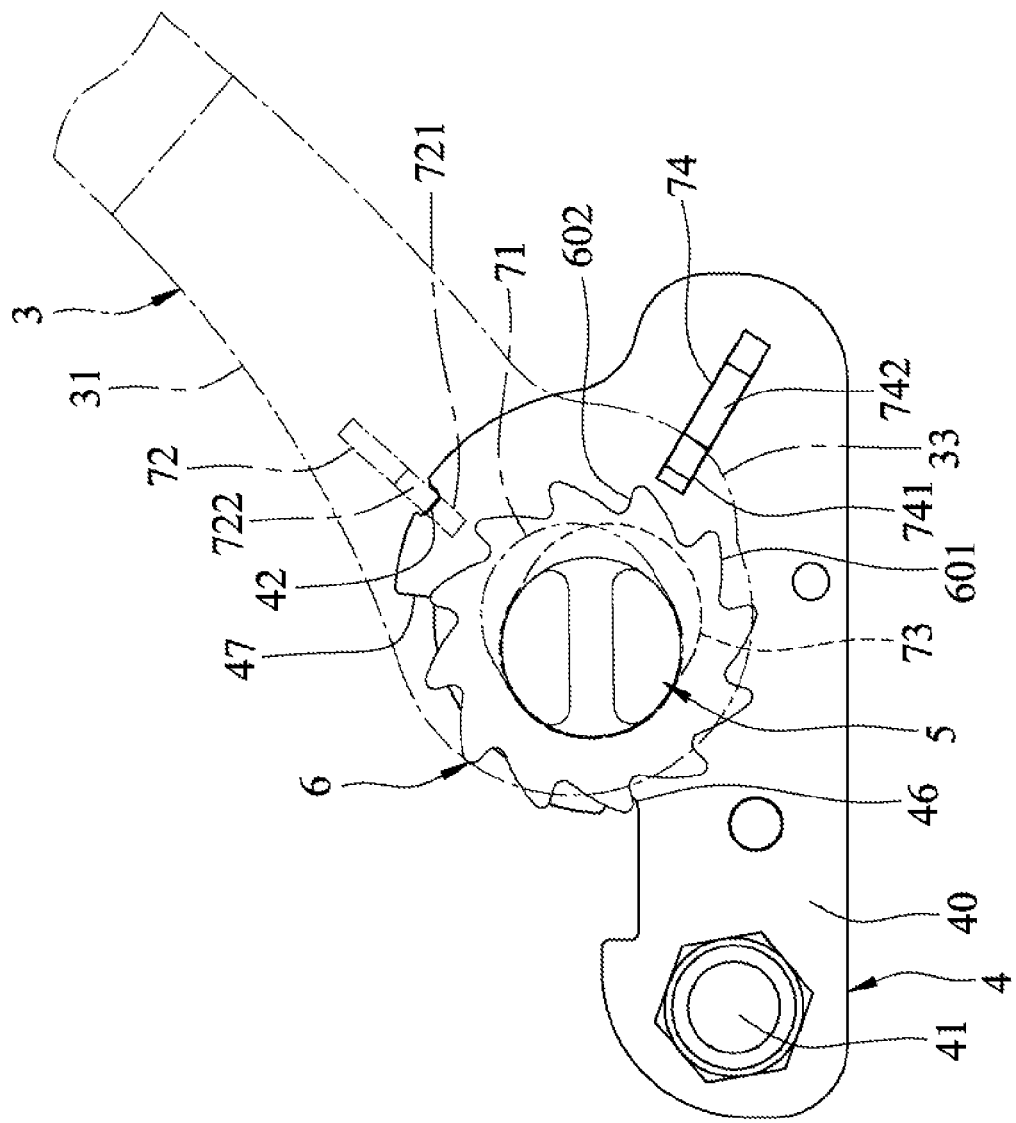
FIG. 8 is a side view of the first embodiment for showing a reel being freely rotatable.

Referring to FIGS. 7-8, when the user wants to unwind the second strap 22 from the reel 5, the user pulls the controlling device 3 away from the reel 5 to a unlock position, and rotates the controlling device 3 clockwise until the first extruded portion 722 is engaged with each corresponding first notch 42; wherein, each extending portion 33 moves the second extruded portion 742 of each corresponding second pawl member 74 away from the ratchet set 6 via the rotation of the controlling device 3, so that the second pawl member 74 is disengaged form the ratchet set 6; simultaneously, the reel 5 is moved relative to each second through hole 73; as a result, the controlling device 3 is locked so as to prevent the second pawl member 74 from being engaged with the ratchet set 6, so that the reel 5 is freely rotated clockwise or counterclockwise because the ratchet set 6 is not engaged with the first pawl members 72 and the second pawl members 74.

Figure 9:
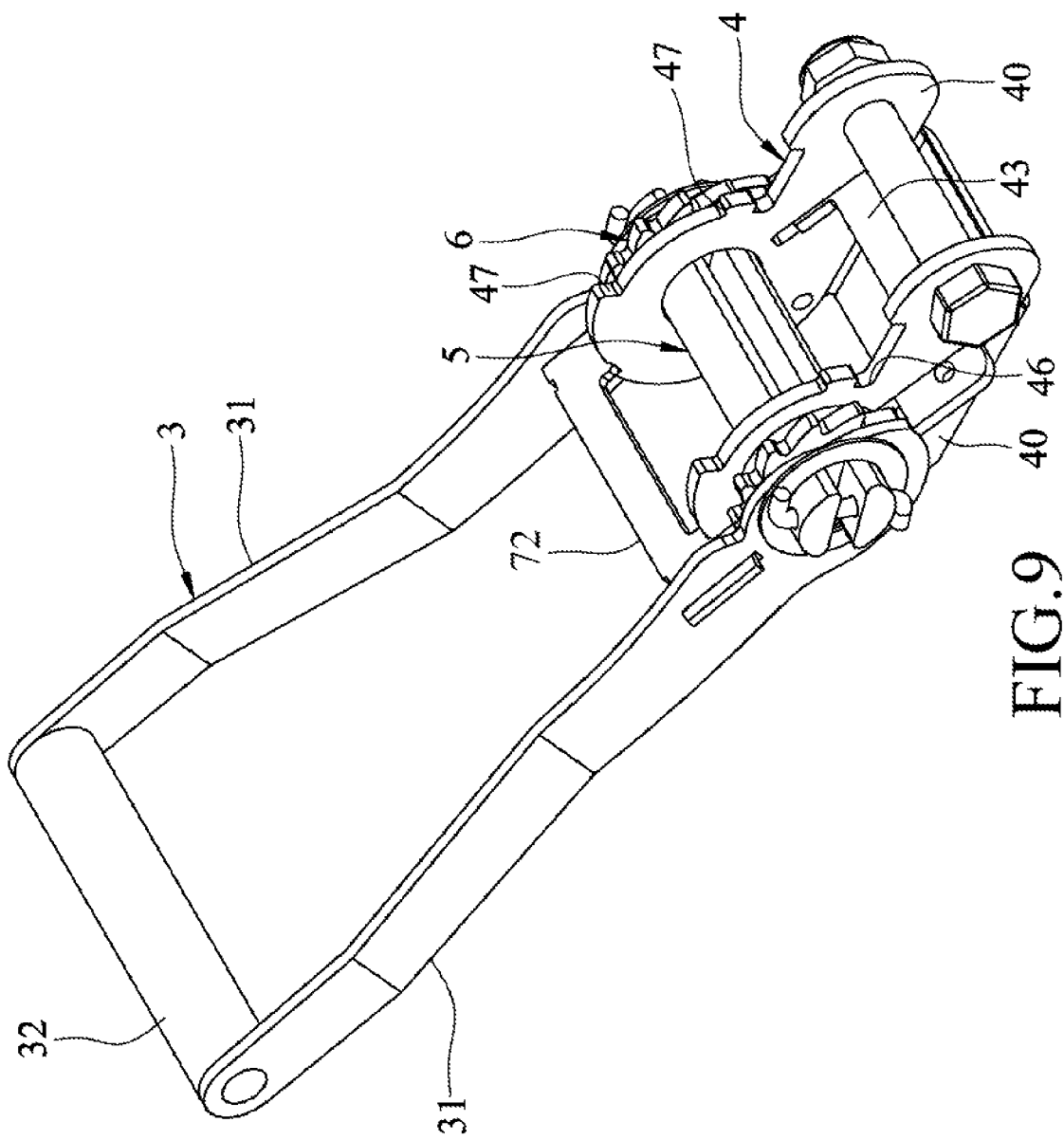
FIG. 9 is a perspective view of a second embodiment of the present invention.
Figure 10:
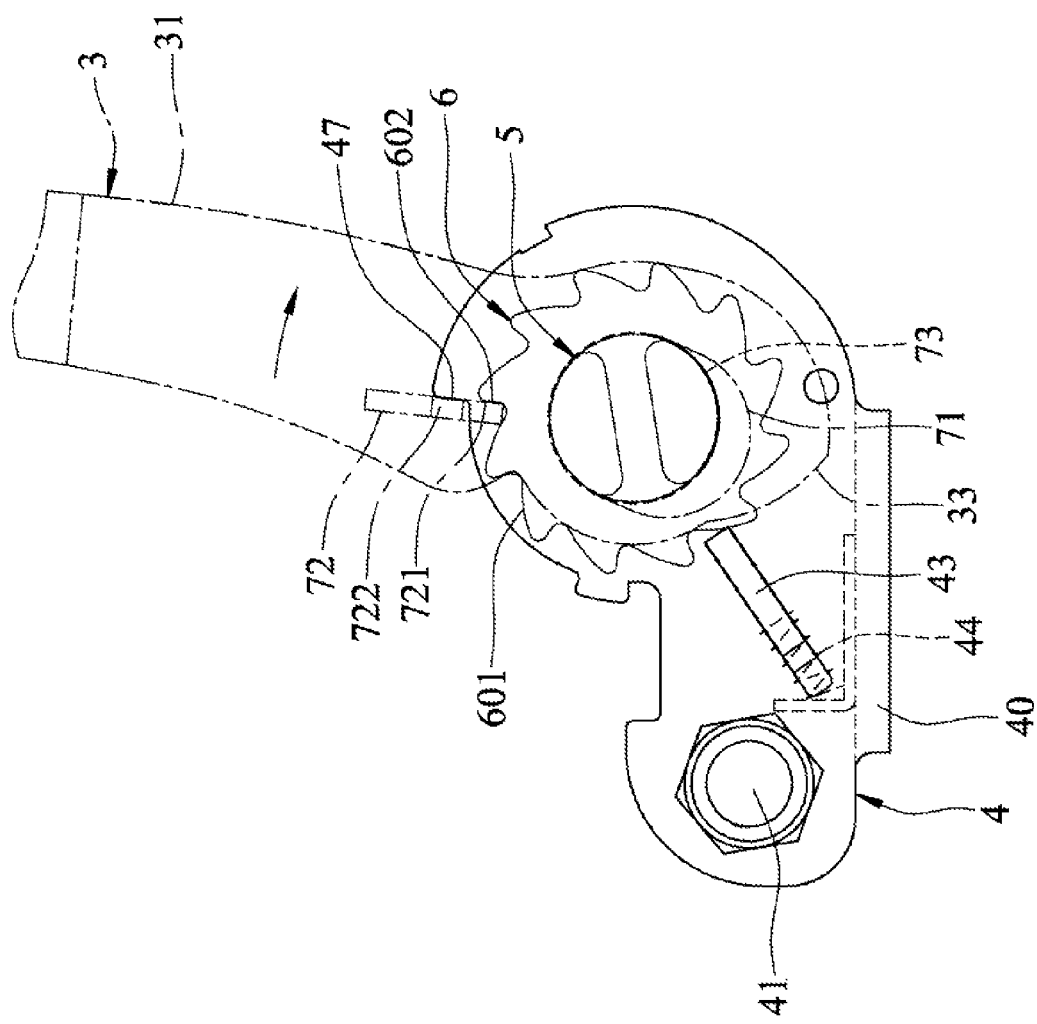
FIG. 10 is a side view of the second embodiment for showing a controlling device being clockwise rotated.

Referring to FIGS. 9-10, a second embodiment of the present invention is described as following (only the differences between the first embodiment and the second embodiment are further described). The operating device 4 has a pawl plate 43 and an elastic member 44 which replace the second pawl members 74 of the first embodiment. The pawl plate 43 is movably assembled between the two wall members 40. The elastic member 44 is assembled on the pawl plate 43 and the wall members 40. A recovery force of the elastic member 44 have the pawl plate 43 engage with the ratchet set 6. Each second through hole 73 is circular and fits the reel 5, so that the reel 5 is immovable relative to each second through hole 73, but rotatable relative to each second through hole 73.

Referring to FIG. 10, when the user pushes the controlling device 3 toward the reel 5 to the lock position and rotates the controlling device 3 clockwise, the ratchet set 6 is rotated clockwise by said rotation, until the first extruded portion 722 abuts against one abutting portion 47 of each corresponding pair of the abutting portions 47; wherein, the first engaging portion 721 is engaged with one engaging face 602; simultaneously, the pawl plate 43 is disengaged from the disengaging faces 601 step by step via the recovery force of the elastic member 44, until the first extruded portion 722 abuts against one abutting portion 47 of each corresponding pair of the abutting portions 47. As a result, the reel 5 is rotated clockwise by the rotation of the ratchet set 6 until the first extruded portion 722 abuts against one abutting portion 47 of each corresponding pair of the abutting portions 47, so that the certain length of the second strap 22 is wound around the reel 5 via the rotation of the reel 5.

Figure 11:
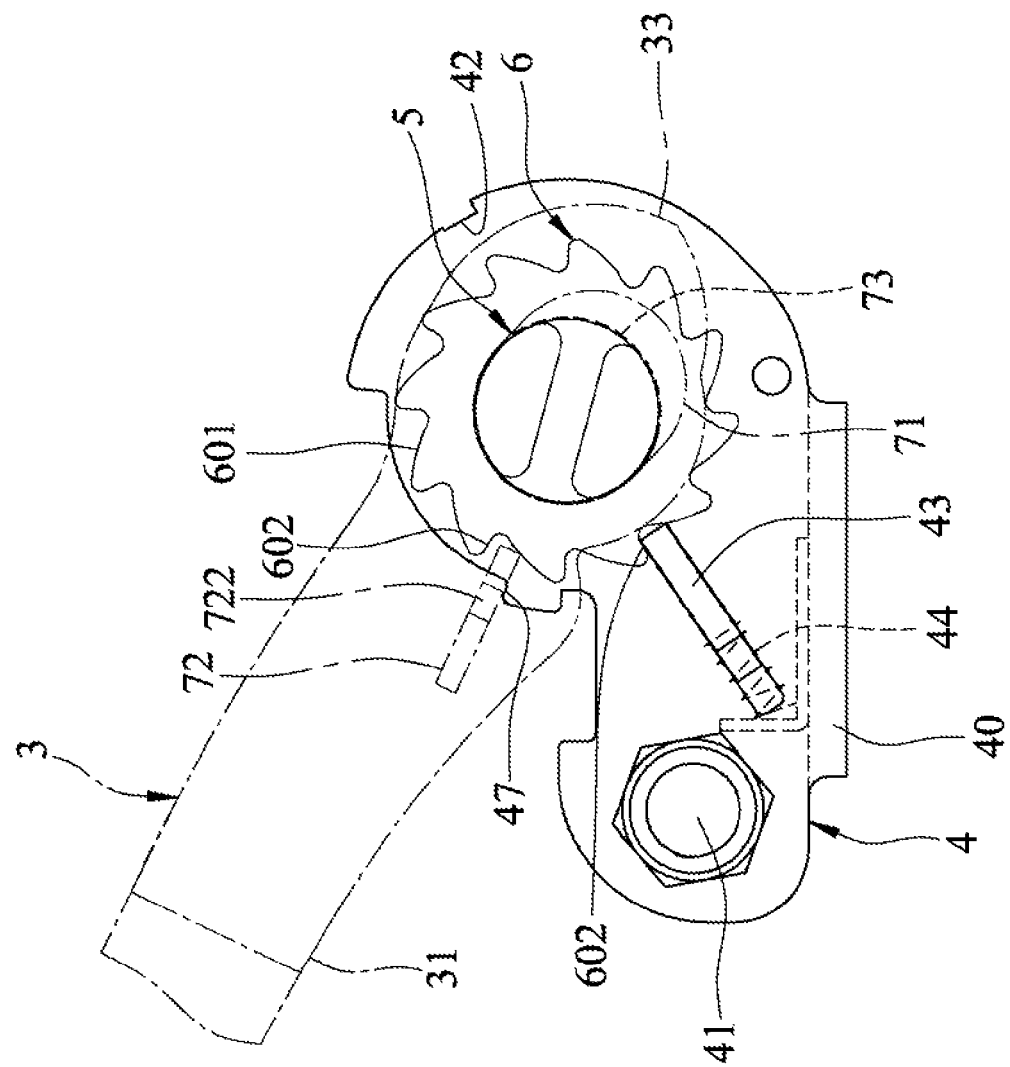
FIG. 11 is a side view of the second embodiment for showing the controlling device being counterclockwise rotated.

Referring to FIG. 11, thereafter, when the user rotates the controlling device 3 counterclockwise, the ratchet set 6 is not rotated counterclockwise by said rotation, even the first extruded portion 722 abuts against another abutting portion 47 of each corresponding pair of the abutting portions 47; wherein, the first engaging portion 721 is disengaged from the disengaging faces 601 step by step; simultaneously, the pawl plate 43 is engaged with one engaging face 602, even the first extruded portion 722 abuts against another abutting portion 47 of each corresponding pair of the abutting portions 47. As a result, the reel 5 and the ratchet set 6 are not rotated counterclockwise even the first extruded portion 722 abuts against another abutting portion 47 of each corresponding pair of the abutting portions 47, so that the second strap 22 would not be unwound from the reel 5 because the reel 5 is not rotated counterclockwise. Thereafter, the user continues rotating the controlling device 3 clockwise, so as to further wind the certain length of the second strap 22 around the reel 5.

Figure 12:
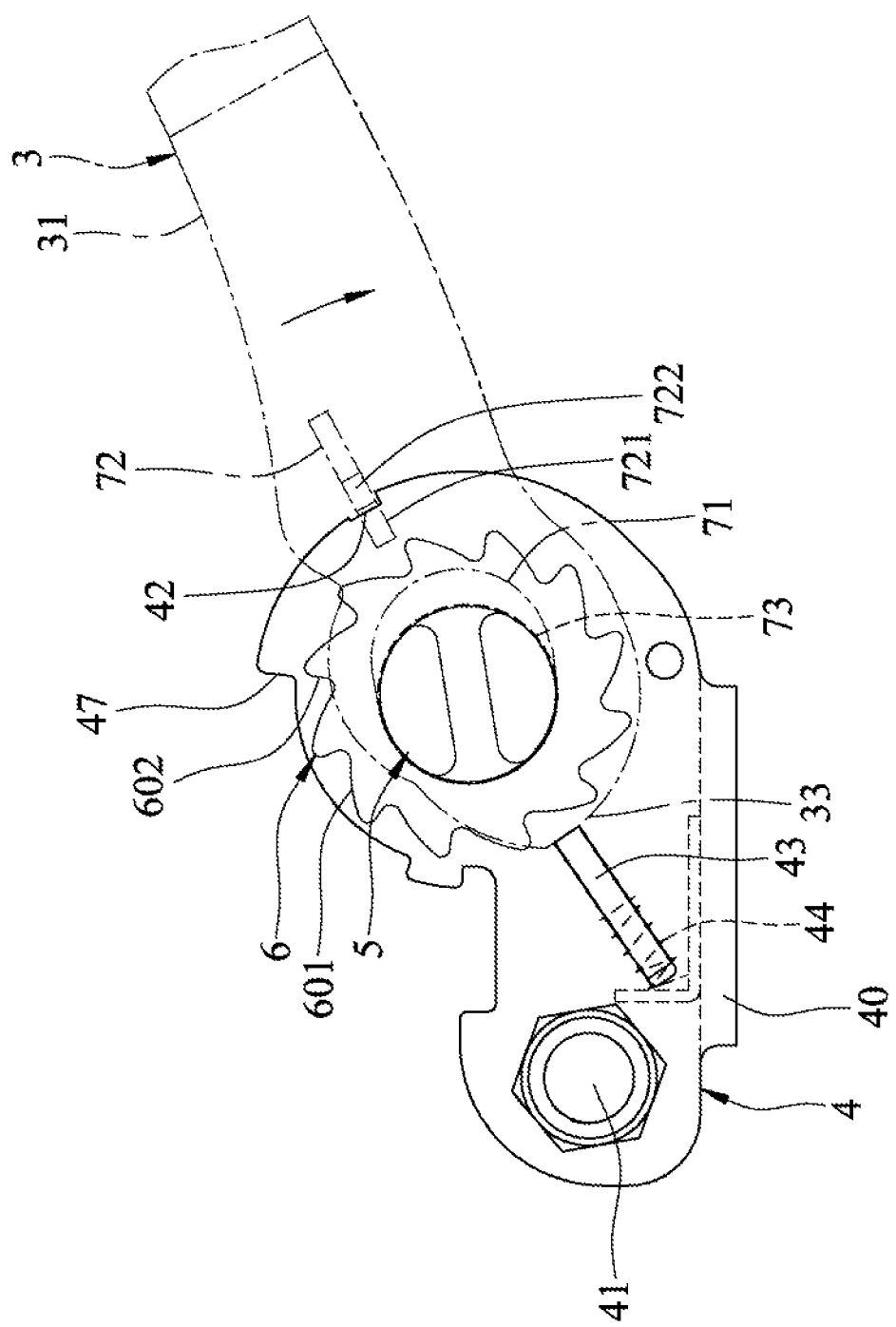
FIG. 12 is a side view of the second embodiment for showing a reel being freely rotatable.

Referring to FIG. 12, when the user wants to unwind the second strap 22 from the reel 5, the user pulls the handle 32 of the controlling device 3 away from the reel 5 to a unlock position, and rotates the controlling device 3 clockwise until the first extruded portion 722 is engaged with each corresponding first notch 42; wherein, each extending portion 33 moves the pawl plate 43 away from the ratchet set 6 via the rotation of the controlling device 3, so that the pawl plate 43 is disengaged form the ratchet set 6; as a result, the controlling device 3 is locked so as to prevent the pawl plate 43 from being engaged with the ratchet set 6, so that the reel 5 is freely rotated clockwise or counterclockwise because the ratchet set 6 is not engaged with the first pawl members 72 and the pawl plate 43.

Figure 13:
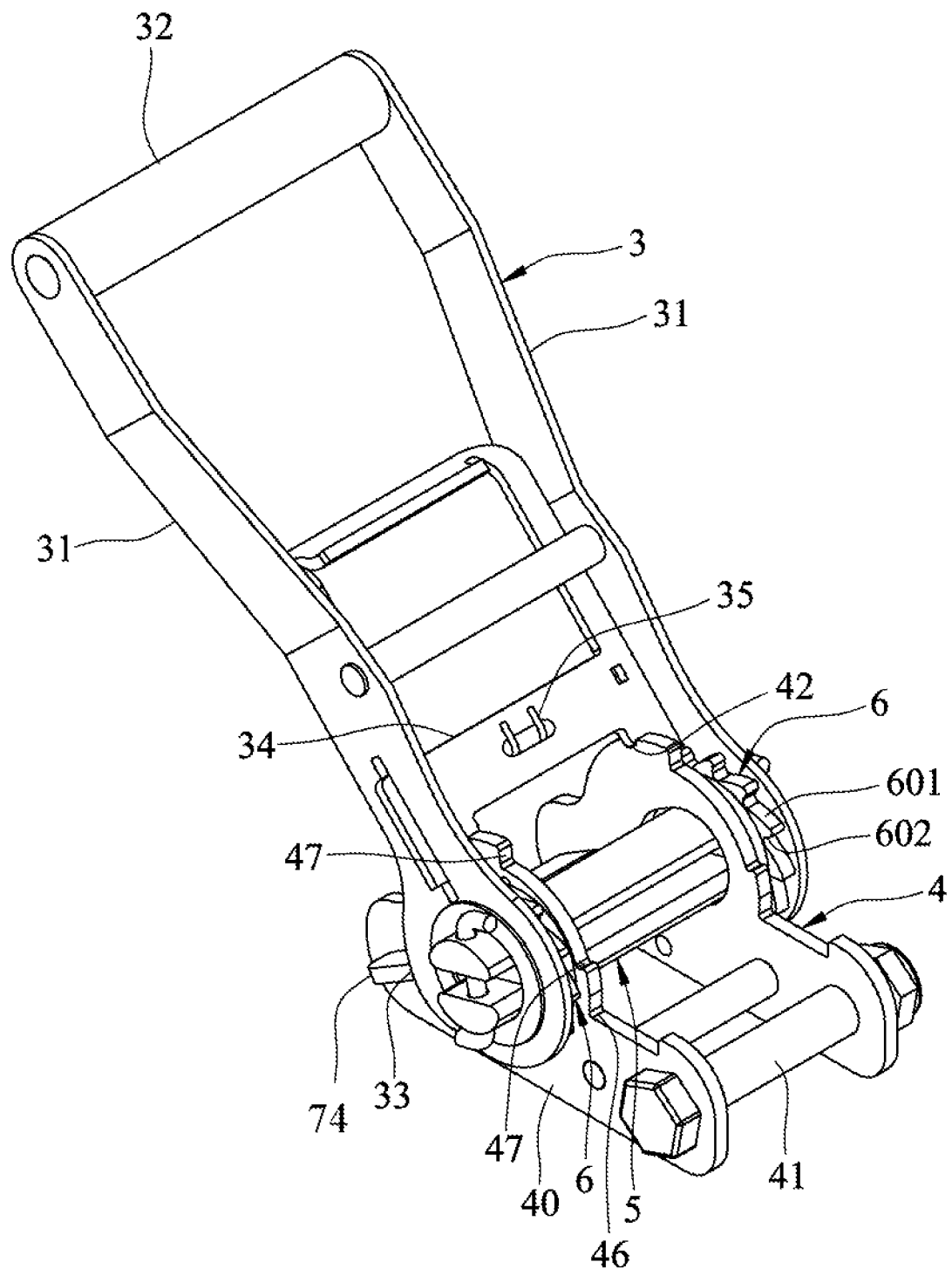
FIG. 13 is a perspective view of a third embodiment of the present invention.

Referring to FIG. 13, a third embodiment of the present invention is described as following (only the differences between the first embodiment and the third embodiment are further described). The controlling device 3 has a plate unit 34 and an elastic unit 35 which replace the first pawl members 72 of the first embodiment. The plate unit 34 is movably assembled between the two connectors 31. The elastic unit 35 is assembled between the plate unit 34 and the connectors 31. A recovery force of the elastic unit 35 have the plate unit 34 engage with the ratchet set 6. Each first through hole 71 is circular and fits the reel 5, so that the reel 5 is immovable relative to each first through hole 71, but rotatable relative to each first through hole 71.

Figure 14:
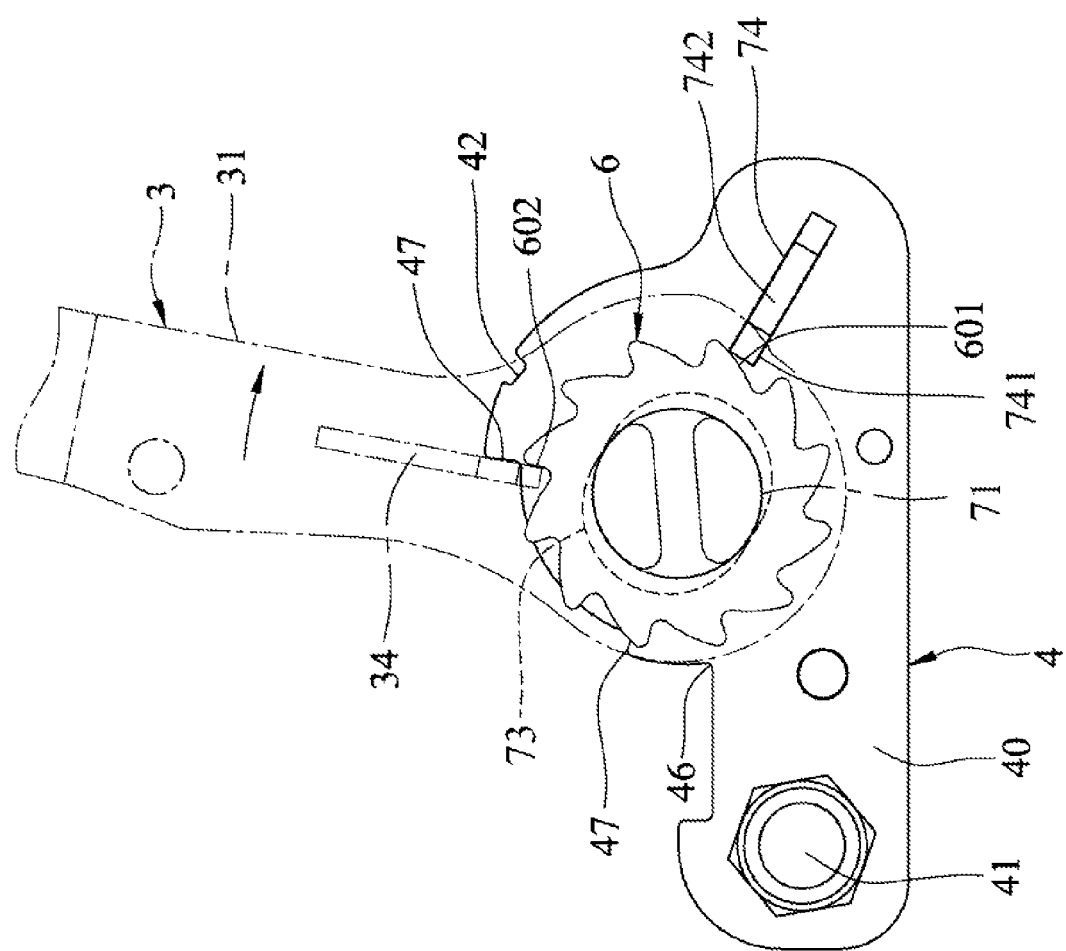
FIG. 14 is a side view of the third embodiment for showing a controlling device being clockwise rotated.

Referring to FIG. 14, when the user rotates the controlling device 3 clockwise, the ratchet set 6 is rotated clockwise by said rotation, until the plate unit 34 abuts against one abutting portion 47 of each corresponding pair of the abutting portions 47; wherein, the plate unit 34 is engaged with one engaging face 602; simultaneously, the second engaging portion 741 is disengaged from the disengaging faces 601 step by step, until the plate unit 34 abuts against one abutting portion 47 of each corresponding pair of the abutting portions 47. As a result, the reel 5 is rotated clockwise by the rotation of the ratchet set 6 until the plate unit 34 abuts against one abutting portion 47 of each corresponding pair of the abutting portions 47, so that a certain length of the second strap 22 is wound around the reel 5 via the rotation of the reel 5.

Figure 15:
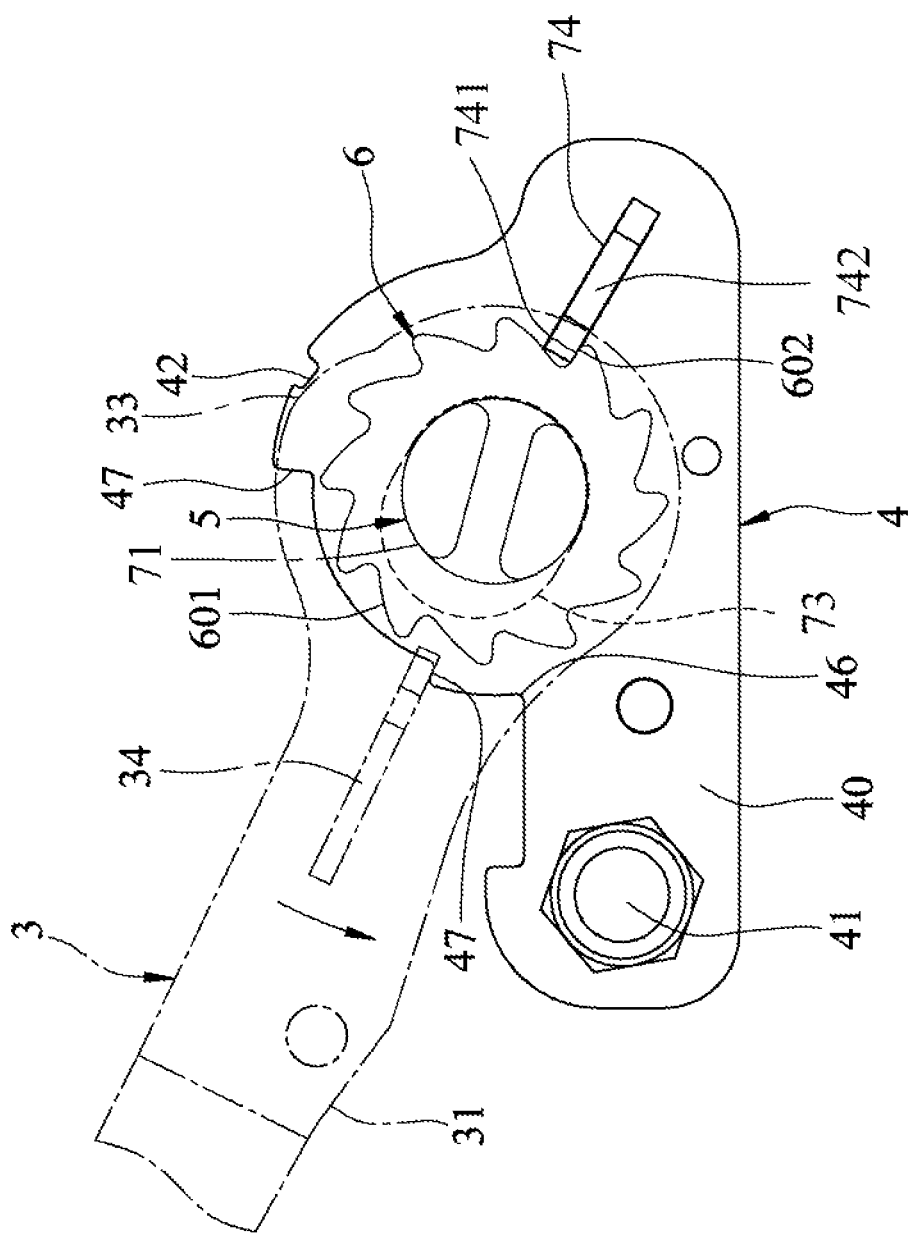
FIG. 15 is a side view of the third embodiment for showing the controlling device being counterclockwise rotated.

Referring to FIG. 15, thereafter, when the user rotates the controlling device 3 counterclockwise, the ratchet set 6 is not rotated counterclockwise by said rotation, even the plate unit 34 abuts against another abutting portion 47 of each corresponding pair of the abutting portions 47; wherein, the plate unit 34 is disengaged from the disengaging faces 601 step by step via the recovery force of the elastic unit 35; simultaneously, the second engaging portion 741 is engaged with one engaging face 602, even the plate unit 34 abuts against another abutting portion 47 of each corresponding pair of the abutting portions 47. As a result, the reel 5 and the ratchet set 6 are not rotated counterclockwise even the plate unit 34 abuts against another abutting portion 47 of each corresponding pair of the abutting portions 47, so that the second strap 22 would not be unwound from the reel 5 because the reel 5 is not rotated counterclockwise. Thereafter, the user continues rotating the controlling device 3 clockwise, so as to further wind the certain length of the second strap 22 around the reel 5.

Figure 16:
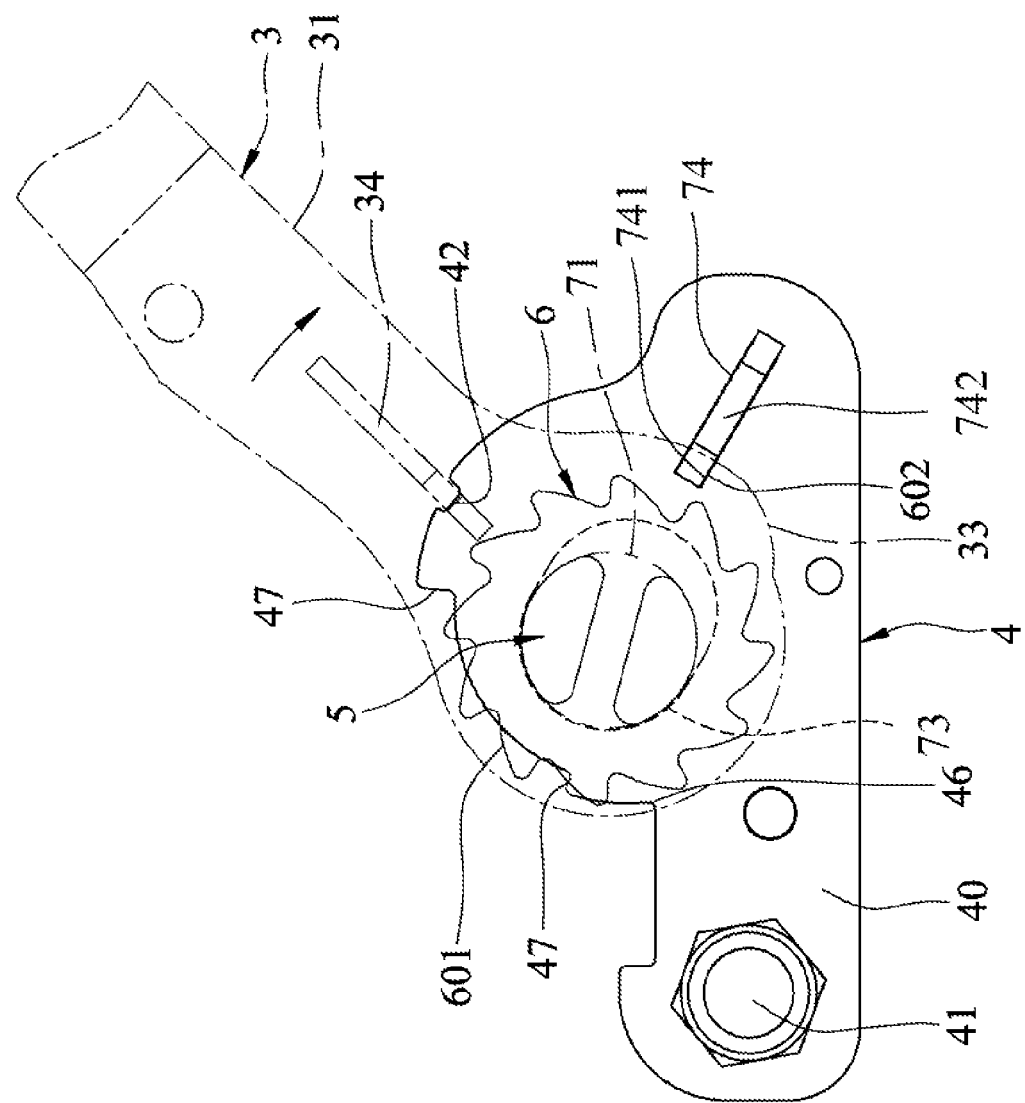
FIG. 16 is a side view of the third embodiment for showing a reel being freely rotatable.
Figure 17:
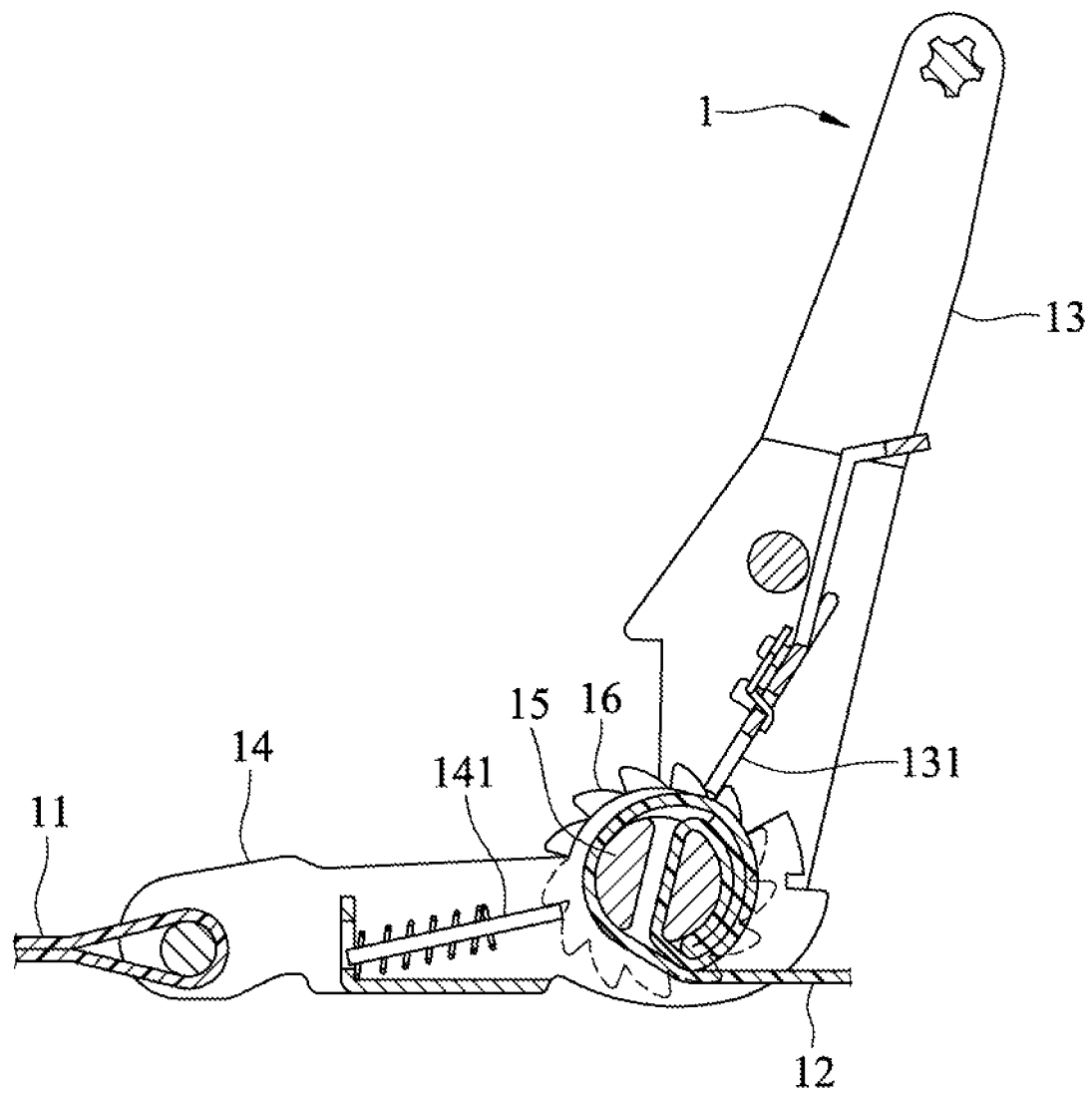
FIG. 17 is a cross-sectional view of a prior art.

Referring to FIG. 16, when the user wants to unwind the second strap 22 from the reel 5, the user pushes the plate unit 34 to disengage the plate unit 34 from the ratchet set 6, and rotates the controlling device 3 clockwise until the plate unit 34 is engaged with each corresponding first notch 42; wherein, each extending portion 33 moves the second extruded portion 742 of each corresponding second pawl member 74 away from the ratchet set 6 via the rotation of the controlling device 3, so that the second pawl member 74 is disengaged form the ratchet set 6; simultaneously, the reel 5 is moved relative to each second through hole 73; as a result, the controlling device 3 is locked so as to prevent the second pawl member 74 from being engaged with the ratchet set 6, so that the reel 5 is freely rotated clockwise or counterclockwise because the ratchet set 6 is not engaged with the plate unit 34 and the second pawl members 74.

All in all, the advantages of the present invention are shown as following:

First, the strain of the second strap 22 have the ratchet set 6 be always engaged with the two first pawl members 72; in other words, the user never worries that the ratchet set 6 might be unexpectedly disengaged from the first pawl members 72 during operation.

Second, the present invention does not need the elastic plate 131 and the elastic pawl 141 for having the ratchet set 6 be unidirectionally rotatable, because of the arrangement of the first pawl members 72, the second pawl members 74 and the controlling device 3.

Third, when the user wants to unwind the second strap 22 from the reel 5, the user moves and rotates the controlling device 3 smoothly with only one hand thereof; therefore, it's very convenient for the user to operate.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A ratchet buckle, configured to connect a first strap and a second strap, comprising:
   a controlling device forming a first through hole defining an axial line therethrough;
   an operating device connected to the first strap, the operating device forming a second through hole;

a reel passing through the first and second through holes of the controlling and operating devices substantially along the axial line, the second strap wound around the reel, each of the first and second through holes being configured to maintain a displacement clearance about the reel;

at least one ratchet set mounted on the reel, the reel being non-rotatable relative to the ratchet set; and a pawl device having a first pawl member and a second pawl member, the first pawl member disposed on the controlling device, wherein the controlling device is movable along a first radial direction relative to the reel between lock and unlock positions, in the lock position the first pawl member being engaged with the ratchet set, and in the unlock position the first pawl member being disengaged from the ratchet set, wherein the second pawl member is disposed on the operating device, the reel being movable along a second radial direction relative the operating device between a first position and a second position, in the first position the second pawl member being engaged with the ratchet set, and in the second position the second pawl member being disengaged from the ratchet set.

2. The ratchet buckle as claimed in claim 1, wherein a strain of the second strap pulls the reel toward the first position.

3. The ratchet buckle as claimed in claim 1, wherein the controlling device has two connectors, a handle and two extending portions; the handle is connected between the two connectors; there are two ratchet sets; there are two first through holes and two first pawl members; each first pawl member is defined on each corresponding connector; each first pawl member has a first engaging portion for preventing the ratchet set from being rotated; each extending portion is defined at one end of each corresponding connector; each extending portion presses each second pawl member and moves the reel relative to the first through hole; as a result, the second pawl member is prevented from being engaged with the ratchet set; the operating device has two wall members, a rod member, two first notches; the two wall members are spaced from each other; the rod member is connected between two ends of the two wall members; the rod member is connected to the first strap; each first notch is formed at a top periphery of each corresponding wall member; when the first pawl member is engaged with each corresponding first notch, the first pawl member is disengaged from the ratchet set.

4. A ratchet buckle, configured to connect a first strap and a second strap, comprising:

a controlling device forming through hole defining an axial line therethrough;

an operating device connected to the first strap;

a reel passing through the through hole of the controlling device and the operating device substantially along the axial line, the second strap wound around the reel, the first through hole being configured to maintain a displacement clearance about the reel;

at least one ratchet set mounted on the reel, the reel being non-rotatable relative to the ratchet set; and a pawl device having a first pawl member, the first pawl member disposed on the controlling device, wherein the controlling device is movable along a radial direction relative to the reel between lock and unlock positions, in the lock position the first pawl member being engaged with the ratchet set, and in the unlock position each first pawl member being disengaged from the ratchet set.

5. The ratchet buckle as claimed in claim 4, wherein the operating device has two wall members and a rod member; the two wall members are spaced from each other; the rod member is connected between two ends of the two wall members; the rod member is connected to the first strap; the operating device has a pawl plate and an elastic member; the pawl plate is movably assembled between the two wall members; the elastic member is assembled on the pawl plate and the wall members; a recovery force of the elastic member has the pawl plate engage with the ratchet set.

6. The ratchet buckle as claimed in claim 5, wherein the controlling device has two connectors, a handle and two extending portions; the handle is connected between the two connectors; there are two ratchet sets; there are two first through holes and two first pawl members; each first pawl member is defined on each corresponding connector; each first pawl member has a first engaging portion for preventing the ratchet set from being rotated; each extending portion is defined at one end of each corresponding connector; each extending portion presses the pawl plate and disengages the pawl plate from the ratchet set; the operating device has two first notches; each first notch is formed at a top periphery of each corresponding wall member; when the first pawl member is engaged with each corresponding first notch, the first pawl member is disengaged form the ratchet set.

7. A ratchet buckle, configured to connect a first strap and a second strap, comprising:

a controlling device forming a first through hole defining an axial line therethrough;

an operating device connected to the first strap, the operating device forming a second through hole;

a reel passing through the first and second through holes of the controlling and the operating devices substantially along the axial line, the second strap wound around the reel, each of the first and second through holes being configured to maintain a displacement clearance about the reel;

a pawl device having a second pawl member; and at least one ratchet set mounted on the reel, the reel being non-rotatable relative to the ratchet set, wherein the controlling device is movable along a radial direction relative to the reel between first and second positions, in the first position the second pawl member being engaged with the ratchet set, and in the second position the second pawl member being disengaged from the ratchet set.

8. The ratchet buckle as claimed in claim 7, wherein a strain of the second strap pulls the reel toward the first position.

9. The ratchet buckle as claimed in claim 7, wherein the operating device has two wall members and a rod member; the two wall members are spaced from each other; the rod member is connected between two ends of the two wall members; the rod member is connected to the first strap; there are two ratchet sets; there are two second through holes and two second pawl members; each second pawl member is defined on each corresponding wall member; each second pawl member has a second engaging portion for preventing the ratchet set from being rotated; the controlling device has two connectors and a handle; the two connectors are connected to the reel; the handle is connected between the two connectors; the controlling device has a plate unit and an elastic unit; the plate unit is movably assembled between the two connectors; the elastic unit is assembled between the plate unit and the connectors; a recovery force of the elastic unit has the plate unit engage with the ratchet set.

10. The ratchet buckle as claimed in claim 9, wherein the controlling device has two extending portions; each extending portion is defined at one end of each corresponding connector; each extending portion presses each second pawl member and moves the reel relative to the second through hole; as a result, the second pawl member is prevented from being engaged with the ratchet set.

* * * * *